(12) United States Patent
Wu et al.

(10) Patent No.: US 11,581,931 B2
(45) Date of Patent: Feb. 14, 2023

(54) CHANNEL STATE INFORMATION FEEDBACK METHODS AND SYSTEMS

(71) Applicant: ZTE Corporation, Guangdong (CN)

(72) Inventors: Hao Wu, Guangdong (CN); Zhaohua Lu, Guangdong (CN); Yu Ngok Li, Guangdong (CN); Yijian Chen, Guangdong (CN); Chuangxin Jiang, Guangdong (CN)

(73) Assignee: ZTE Corporation, Guangdong (CN)

( * ) Notice: Subject to any disclaimer, the term of this patent is extended or adjusted under 35 U.S.C. 154(b) by 214 days.

(21) Appl. No.: 17/028,214

(22) Filed: Sep. 22, 2020

(65) Prior Publication Data

US 2021/0006315 A1 Jan. 7, 2021

Related U.S. Application Data

(63) Continuation of application No. PCT/CN2018/080827, filed on Mar. 28, 2018.

(51) Int. Cl.
*H04B 7/06* (2006.01)
*H04B 7/0456* (2017.01)
(Continued)

(52) U.S. Cl.
CPC ......... *H04B 7/0626* (2013.01); *H04B 7/0456* (2013.01); *H04L 1/1614* (2013.01); *H04W 24/10* (2013.01); *H04W 72/0446* (2013.01)

(58) Field of Classification Search
CPC ... H04B 7/0626; H04B 7/0456; H04L 1/1614; H04L 1/0073; H04L 1/0026;
(Continued)

(56) References Cited

U.S. PATENT DOCUMENTS

2006/0072510 A1 4/2006 Aizawa
2011/0305161 A1* 12/2011 Ekpenyong ............. H04L 5/001
370/252
(Continued)

FOREIGN PATENT DOCUMENTS

CN 103891377 A 6/2014
EP 3282661 A1 2/2018
(Continued)

OTHER PUBLICATIONS

International Search Report and Written Opinion dated Jan. 4, 2019 for International Application No. PCT/CN2018/080827, filed on Mar. 28, 2018 (8 pages).
(Continued)

*Primary Examiner* — Habte Mered
(74) *Attorney, Agent, or Firm* — Perkins Coie LLP (57) ABSTRACT

Disclosed are methods, systems and devices for channel state information feedback to facilitate, for example, high-performance beamforming or precoding in multiple input multiple output (MIMO) systems. One example method includes performing multiple transmissions of a channel measurement report on multiple transmission occasions. Another example method includes performing multiple receptions of a channel measurement report on multiple reception occasions, where the multiple receptions at a network node correspond to multiple transmissions from a wireless device. In both exemplary methods, a timing of the multiple transmissions is based on at least one of a number of the multiple transmission occasions, a time gap between adjacent transmission occasions of the multiple transmission occasions, and one or more timeslots that include the multiple transmission occasions.

25 Claims, 8 Drawing Sheets

← 1000

Performing multiple transmissions of a channel measurement report on multiple transmission occasions, wherein a timing of the multiple transmissions is based on at least one of a set of repetition transmission parameters ⟵ 1010

(51) Int. Cl.
*H04L 1/16* (2006.01)
*H04W 24/10* (2009.01)
*H04W 72/04* (2009.01)
*H04L 1/1607* (2023.01)
*H04W 72/0446* (2023.01)

(58) Field of Classification Search
CPC ....... H04L 1/0027; H04L 1/0072; H04L 1/08; H04L 5/0057; H04W 24/10; H04W 72/0446
See application file for complete search history.

(56) References Cited

U.S. PATENT DOCUMENTS

| | | | | |
|---|---|---|---|---|
| 2012/0008580 | A1* | 1/2012 | Lee | H04L 1/1812 370/329 |
| 2013/0114656 | A1 | 5/2013 | Sayana et al. | |
| 2014/0301231 | A1* | 10/2014 | Hooli | H04W 24/08 370/252 |
| 2019/0098523 | A1* | 3/2019 | Muruganathan | H04L 5/0092 |
| 2019/0215870 | A1* | 7/2019 | Babaei | H04W 24/10 |
| 2020/0186318 | A1* | 6/2020 | Miao | H04W 56/0045 |
| 2020/0358504 | A1* | 11/2020 | Takeda | H04L 1/0073 |

FOREIGN PATENT DOCUMENTS

| | | |
|---|---|---|
| WO | 2013060763 A1 | 5/2013 |
| WO | 2016089269 A1 | 6/2016 |
| WO | 2016089269 A1 | 6/2016 |
| WO | 2017/012346 A1 | 1/2017 |

OTHER PUBLICATIONS

European Extended Search Report dated Mar. 21, 2021 for EP Application No. 18911799.7 (8 pages).
Ericsson, "Repetition with aperiodic CSI for BL/CE UE", R1-167857, 3GPP TSG-RAN1 Meeting #86 Gothenburg, Sweden, Aug. 22, 2016-Aug. 26, 2016, 10 pages.
Chinese Office Action, CN Application No. 201880091799.6, dated May 31, 2021, 9 pages.

* cited by examiner

Performing multiple transmissions of a channel measurement report on multiple transmission occasions, wherein a timing of the multiple transmissions is based on at least one of a set of repetition transmission parameters — 1010

Performing multiple receptions of a channel measurement report on multiple reception occasions — 1110

CHANNEL STATE INFORMATION FEEDBACK METHODS AND SYSTEMS

CROSS-REFERENCE TO RELATED APPLICATION

This patent document is a continuation of and claims priority to and benefits of International Application No. PCT/CN2018/080827, filed on 28 Mar. 2018, entitled "CHANNEL STATE INFORMATION FEEDBACK METHODS AND SYSTEMS". The entire content of the before-mentioned patent application is incorporated by reference as part of the disclosure of this patent document.

TECHNICAL FIELD

This document is directed generally to wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques need to provide channel state and control information for increased capacity and enhanced performance.

SUMMARY

This document relates to methods, systems, and devices for the channel state information (CSI) feedback in at least in Long Term Evolution (LTE) and New Radio (NR) systems. In multiple input multiple output (MIMO) systems, CSI feedback is a key component to facilitating high-performance beamforming or precoding. CSI feedback is transmitted from a wireless node (e.g. user equipment (UE)) to a network node (e.g. gNB). The gNB may use the CSI reported from a UE to enhance downlink (DL) transmission performance. Hence the effectiveness of the CSI report and the system performance rely on the transmission of CSI. Embodiments of the disclosed technology improve CSI report transmissions and feedback.

In one exemplary aspect, a wireless communication method is disclosed. The method, which may be implemented at a wireless device, includes performing multiple transmissions of a channel measurement report on multiple transmission occasions, where a timing of the multiple transmissions is based on at least one of a number of the multiple transmission occasions, a time gap between adjacent transmission occasions of the multiple transmission occasions, and one or more timeslots that include the multiple transmission occasions.

In another exemplary aspect, a wireless communication method is disclosed. The method, which may be implemented at a network node (e.g. a base station or a gNB), includes performing multiple receptions of a channel measurement report on multiple reception occasions, where a timing of the multiple receptions is based on at least one of a number of the multiple reception occasions, a time gap between adjacent reception occasions of the multiple reception occasions, and one or more timeslots that include the multiple reception occasions.

In yet other exemplary embodiments, the above-described methods are embodied in the form of processor-executable code and stored in a computer-readable program medium.

In yet other exemplary embodiments, devices that are configured or operable to perform the above-described methods are disclosed.

The above and other aspects and their implementations are described in greater detail in the drawings, the descriptions, and the claims.

DETAILED DESCRIPTION

In wireless communications, MIMO is a popular technology to enhance performance by using multiple antennas on the transmission or reception side. CSI reports can be classified into several types: periodic CSI, semi-persistent CSI and aperiodic CSI. For periodic CSI, the CSI report is transmitted with a configured periodicity, and where in each periodicity, one CSI report instance is transmitted. For semi-persistent CSI, CSI is activated by a signaling from a BS, transmitted with a periodicity and terminated by a de-activation signaling. In each periodicity, one CSI report instance is transmitted. For aperiodic CSI, CSI report is transmitted in one instance triggered by BS signaling.

Figure 1:
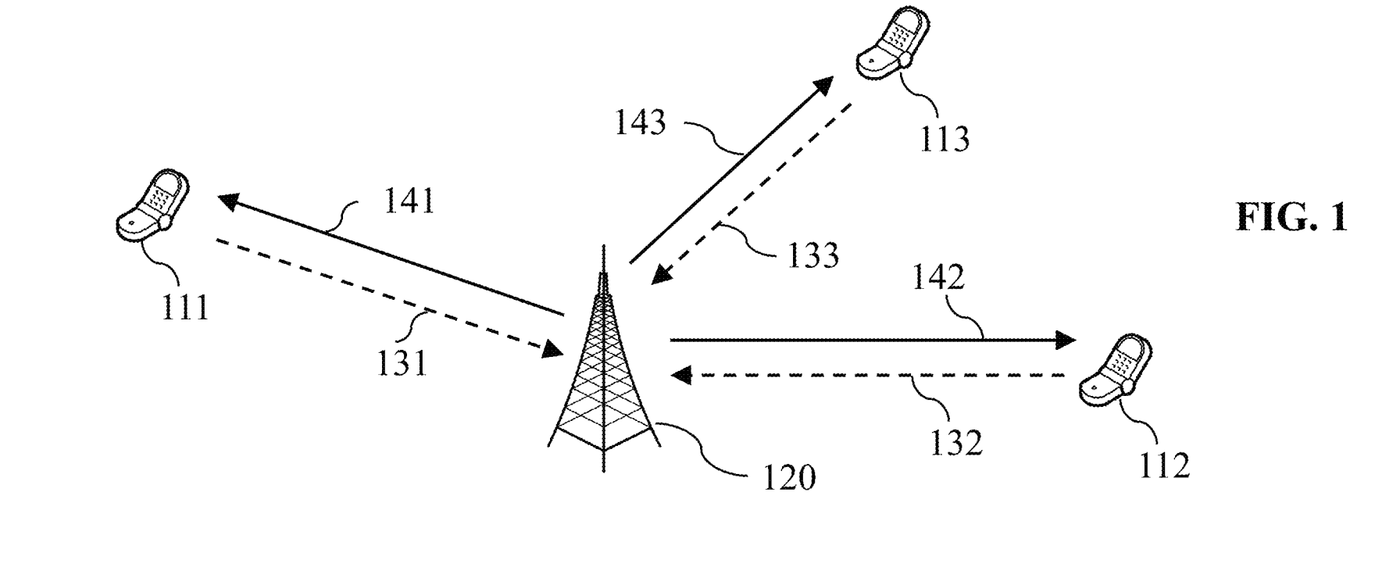
FIG. 1 shows an example of a base station (BS) and user equipment (UE) in wireless communication, in accordance with some embodiments of the presently disclosed technology.

FIG. 1 shows an example of a wireless communication system that includes a BS 120 and one or more UEs 111, 112 and 113. In some embodiments, the BS may transmit a request (141, 142, 143) to the UEs, which triggers the transmission of CSI report. In response, the UEs may transmit CSI reports (131, 132, 133) to the BS.

To transmit CSI over an uplink (UL) physical channel, e.g., physical uplink shared channel (PUSCH) or physical uplink control channel (PUCCH), the transmission of CSI is an issue to facilitate high-performance MIMO operation. In some scenarios, improved CSI transmission is required. In existing systems, one CSI report may be transmitted in one instance in one periodicity or upon one triggering signaling. This transmission strategy may not fulfill the requirements of future systems. Embodiments of the disclosed technology provide approaches to improving CSI transmissions.

Figure 2:
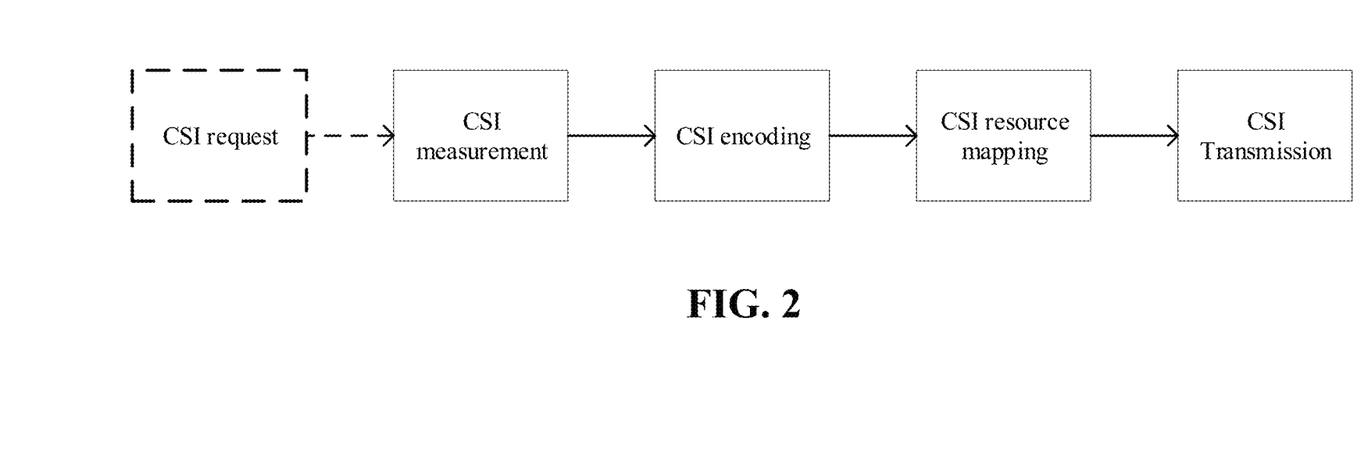
FIG. 2 shows an example of a CSI reporting procedure.

In some embodiments, the CSI reporting procedure is as shown in FIG. 2. The UE estimates CSI based on corresponding reference signal. Then the UE encodes the estimated CSI to a bit sequence, which is subsequently mapped to physical resources. Finally, the UE transmits the encoded CSI bit sequence in the mapped resources. For aperiodic or semi-persistent CSI, the CSI request (from a network node such as the BS) is another step prior to the CSI measurement. From the BS perspective, BS receives the CSI reports with the knowledge of the CSI encoding, resource mapping and transmission.

Embodiments of the disclosed technology implement example CSI resource mapping and transmission methods as described in Schemes 1 and 2. Example CSI encoding methods are described in Scheme 3, and exemplary additional considerations on the CSI transmission and reporting methods, which may include resolving colliding transmissions, are given in Scheme 4. Section headings are used in the present document to improve readability of the description and do not in any way limit the discussion or the embodiments to the respective sections only.

Scheme 1: Example Embodiments for Aperiodic CSI Feedback

For aperiodic CSI reporting, each CSI request signal triggers repetition transmissions of the CSI report, where each repetition corresponds to a CSI report occasion. For example, if CSI request signaling is indicated in slot m, the CSI report is transmitted in slot $m+k_1$ and in slot $m+k_2$, where $0 \leq k_1 < k_2$. For example, the initial transmission (or the first occasion) of one CSI report is in slot $m+k_1$, the n-th occasion (or the (n−1)-th re-transmission) of this CSI report is in slot $m+k_1+(n-1)*k_T$, where $k_T \geq 1$ is the time gap between two adjacent occasions, $1 \leq n \leq N$, and $N \geq 1$ is the maximum number of transmissions (or repetitions) of this CSI report. Here, all variables are integers.

Figure 3:
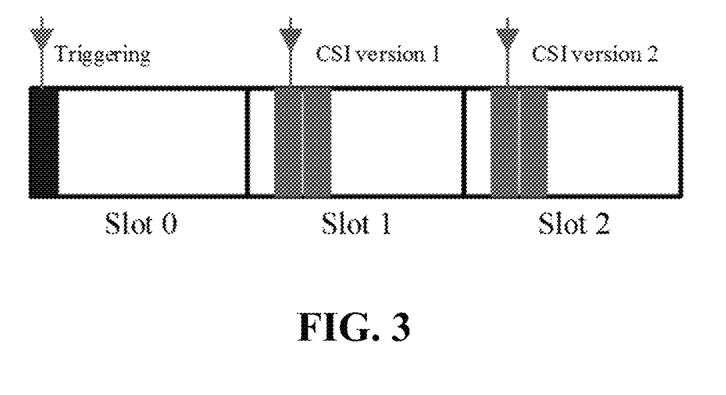
FIG. 3 shows an example of an aperiodic CSI repetition embodiment.

In some embodiments, N, $k_T$, and $k_1$ are fixed values. In other embodiments, these parameters may be signaled by the BS. For example, $k_1$ can be indicated in L1 signaling (e.g., downlink control information (DCI)), and N and $k_T$ can be indicated in higher layer (e.g., L2 or L3, MAC CE or RRC) signaling. FIG. 3 shows an example of triggering CSI repetition transmission in two slots. As shown in FIG. 3, two repetitions of the CSI (version 1 and version 2) are the first and the second transmission of this CSI report in slots 1 and 2, respectively. The repetitions are transmitted after a triggering request is received in slot 0.

In an example, the repetition transmission(s) of the aperiodic CSI report can be carried in an uplink control channel or an uplink shared channel such as the PUCCH or PUSCH. If the repetition transmission of the aperiodic CSI report is carried on PUCCH, the BS can configure information including at least one of the following: PUCCH resource configuration for repetition transmission of the aperiodic CSI report, the time gap between each two adjacent occasion of the corresponding PUCCH resource in the repetition(s), and the number of occasions of the corresponding PUCCH resource.

If the repetition transmission of the aperiodic CSI report is carried on PUSCH, the BS can trigger the PUSCH with a request identifying a manner of repetition. For example, the BS may configure the time gap between each two adjacent occasions of the corresponding PUSCH resource in the repetition(s), and/or the number of occasions of the corresponding PUSCH resource. BS triggers the PUSCH transmission in the slots corresponding to the configured time gap and/or number of occasions. The CSI may be multiplexed with data on the triggered PUSCH repetition occasions.

Scheme 2: Examples Embodiments for Semi-persistent/Periodic CSI Feedback

For semi-persistent/periodic CSI reporting with periodicity W, each CSI transmission periodicity contains $R \geq 1$ repetitions of the CSI report, where each repetition corresponds to one occasion in the repetition(s). In an example, in one periodicity, the first occasion of the CSI report is transmitted in slot m, the n-th occasion (or the (n−1)-th re-transmission) of this CSI report in this periodicity is in slot $m+(n-1)*k_T$, where $k_T \geq 1$ is the time gap between each two adjacent occasions, $1 \leq n \leq N$, and $N \geq 1$ is the maximum number of transmissions (or repetitions) of this CSI report. In some embodiments, N and $k_T$ may be fixed values. In other embodiments, these parameters may be signaled by BS, (e.g., L1, L2 or L3 signaling).

Figure 4:
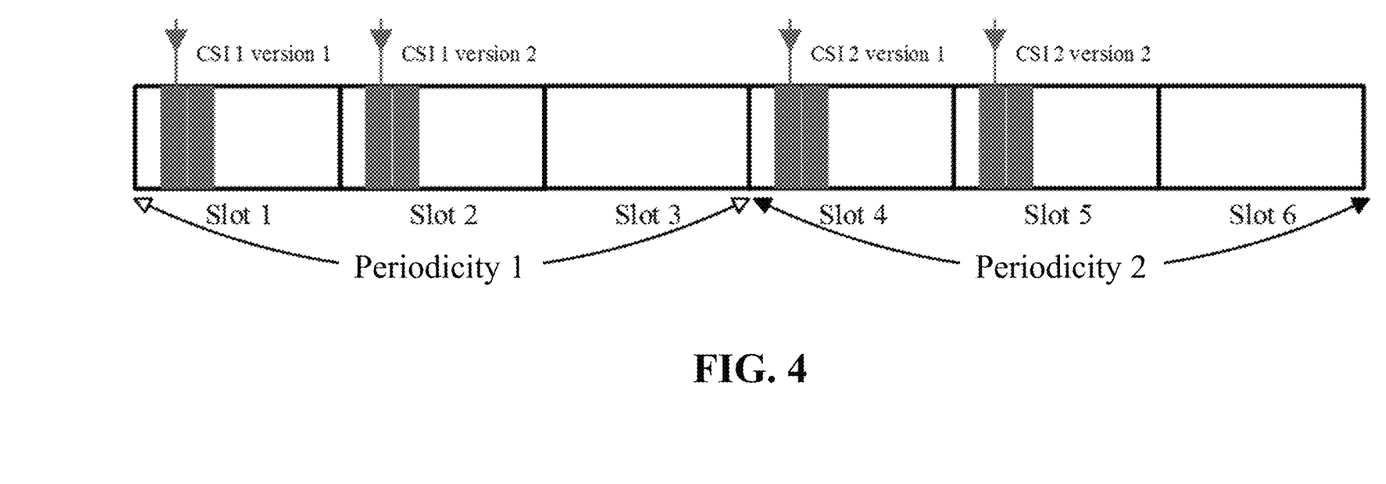
FIG. 4 shows an example of a semi-persistent/periodic CSI repetition embodiment.

FIG. 4 shows an example of the semi-persistent/periodic CSI repetition approach. In the first period, two repetitions of one CSI report, e.g., CSI 1 versions 1 and 2, are transmitted in two occasions. In the second periodicity, two repetitions of the CSI report in this period, e.g., CSI 2 version 1 and 2 are transmitted in two occasions. In some embodiments, the occasions used for CSI repetition of each periodicity may be determined by a bitmap for the slots in this periodicity. In an example, the bitmap may select transmission slots from a set of candidate slots. For example, '1' in the bitmap means the corresponding slot in the periodicity contains CSI transmission occasion, and '0' in the bitmap means the corresponding slot in the periodicity does not contain CSI transmission occasion.

Figure 5A:
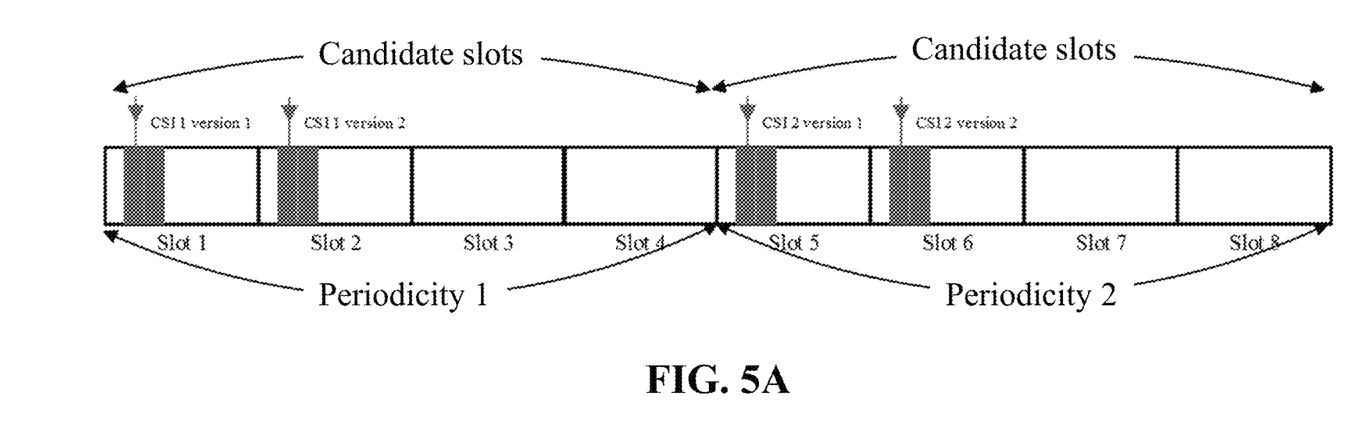
FIGS. 5A and 5B show examples of selecting candidate slots based on a bitmap.

In an example of semi-persistent/periodic CSI reporting, and in the context of FIG. 5A, it is assumed that the CSI periodicity is P and the CSI slot offset is s. Thus, the slots s+P*n, where n is an integer number, are the slots indicated by CSI period and CSI slot offset. The candidate slots may be the slots between two slots indicated by the CSI period and the CSI slot offset, including one of the two slots, e.g., slots {Pn+s, Pn+1+s, . . . , Pn+P−1+s}. Hence a P-bit bitmap is used to indicate the slots selected from the candidate slots, where the bit '1' in the bitmap implies the corresponding slot is selected. In the example shown in FIG. 5A, the bitmap may be given as {1,1,0,0}.

Figure 5B:
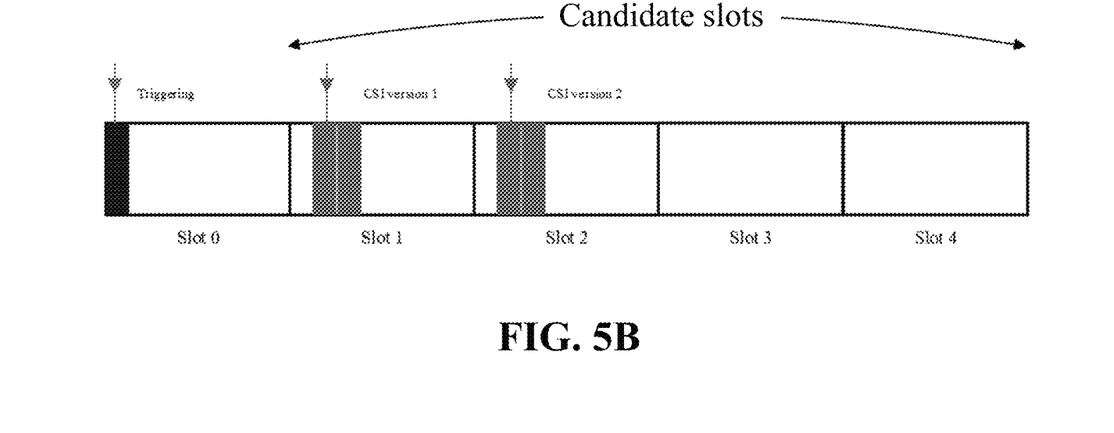

In an example of aperiodic CSI reporting, and in the context of FIG. 5B, the first slot among candidate slots is the slot indicated by the slot offset associated with the triggering DCI. Specifically, the CSI triggering is in slot T, and the slot offset associated with the triggering DCI is S. Then the first slot among candidate slots is slot T+S. Then the candidate slots are the contiguous K slots starting from the first slot, e.g. slots {T+S, T+S+1, . . . , T+S+K−1}. K may also be signaled from BS. A K-bit bitmap is used to indicate the select slots, where the bit '1' in the bitmap implies the corresponding slot is selected. In the example shown in FIG. 5B, the bitmap may be given as {1,1,0,0}.

In some embodiments, a transmission slot may be indicated by a configured parameter (e.g., L1, L2 or L3 signaled parameter), which may be the CSI reporting periodicity and/or the CSI reporting slot offset, and indicates the first occasion of the CSI repetition transmission of the corresponding periodicity. In an example, the time gap between the first occasions of the two adjacent periodicities equals the periodicity of CSI reporting.

In some embodiments, the first occasion of the CSI repetition transmission in the first periodicity depends on a CSI trigger or activation signaling. For example, the first occasion of the CSI repetition transmission in the first periodicity is D slots after the slot containing the CSI trigger or activation signaling (e.g., through L1 or L2 signaling). D can be indicated with a signaling (e.g., through L1, L2 or L3 signaling), and/or a specified (or predetermined, or fixed) value. Furthermore, the first occasion of each of the remaining periodicity(s) is $C*T_P$ slots after the first occasion of the first periodicity, where $T_P$ is the CSI reporting periodicity and C is an integer number.

Figure 6A:
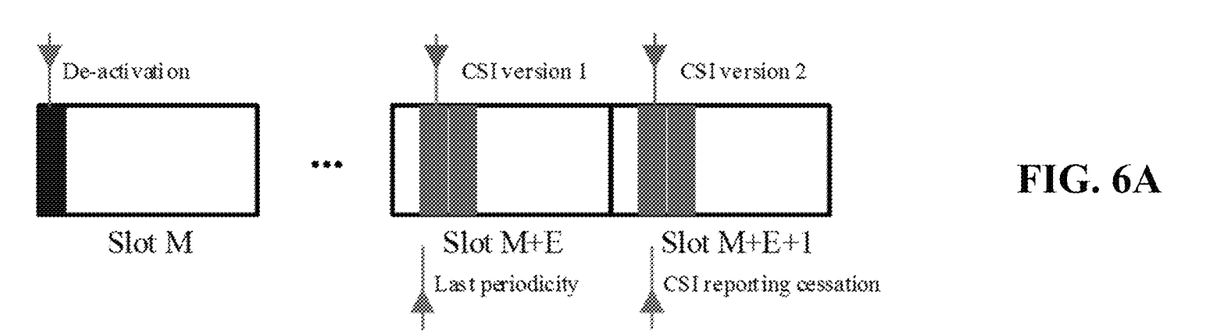
FIGS. 6A and 6B show examples of final periodic transmissions of CSI reports upon receiving de-activation signaling.

In another example, as shown in FIG. 6A, after receiving a de-activation signaling of the CSI reporting, the first occasion of the last periodicity occurs E slots after the slot receiving the de-activation signaling, where E is an integer number. The cessation of the CSI repetition transmission happens in the last occasion of the last periodicity. Assuming a periodicity of two and that the de-activation signal is received in slot M, the first occasion of the last periodicity is in slot M+E, which is followed by the second transmission of that period in slot M+E+1, as shown in FIG. 6A.

Figure 6B:
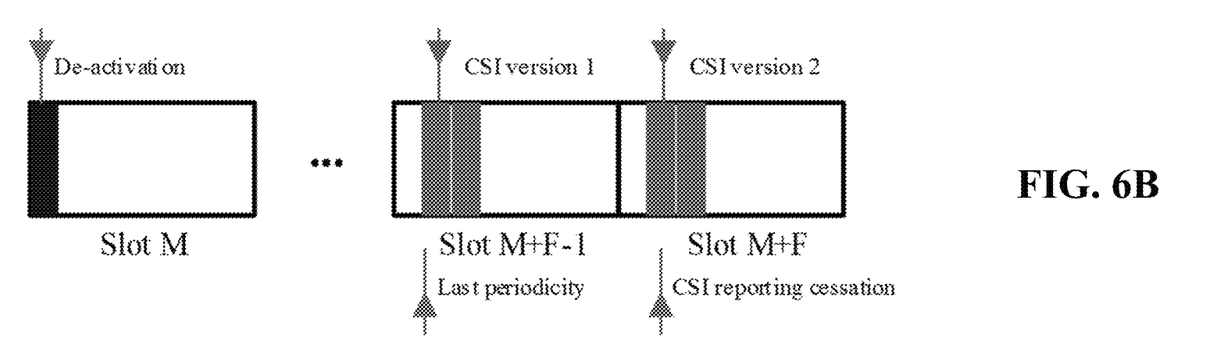

In another example, as shown in FIG. 6B, after receiving a de-activation signaling of the CSI reporting, the last occasion of the last periodicity occurs F slots after the slot receiving the de-activation signaling, where F is an integer number. The cessation of the CSI repetition transmission happens in the last occasion of the last periodicity. Assuming a periodicity of two and that the de-activation signal is received in slot M, the last occasion of the last periodicity (which is the second of the two transmissions in that period) is in slot M+F, which is preceded by the first transmission of that period in slot M+F−1, as shown in FIG. 6B.

In some embodiments, the UE may decide the first transmission of a CSI report in any occasion of one period, and terminate the repetition of this CSI report in the last occasion of this period. In other embodiments, the BS may determine these parameters, and communicate them to the UE via signaling.

In an example, the repetition transmission(s) of the semi-persistent/periodic CSI report can be carried in PUCCH or PUSCH. If the repetition transmission of the semi-persistent/periodic CSI report is carried on PUCCH, the BS can configure information including at least one of the following: PUCCH resource configuration for repetition transmission of the aperiodic CSI report, the time gap between each two adjacent occasion of the corresponding PUCCH resource in the repetition(s), and the number of occasions of the corresponding PUCCH resource.

If the repetition transmission of the semi-persistent/periodic CSI report is carried on PUSCH, the BS can trigger the PUSCH with a request manner of repetition. For example, the BS may configure the time gap between each two adjacent occasions of the corresponding PUSCH resource in the repetition(s), and/or the number of occasions of the corresponding PUSCH resource. BS triggers the PUSCH transmission in the slots corresponding to the configured time gap and/or number of occasions. The CSI may be multiplexed with data on the triggered PUSCH repetition occasions.

Scheme 3: Example Embodiments for CSI Encoding and Mapping

Figure 7:
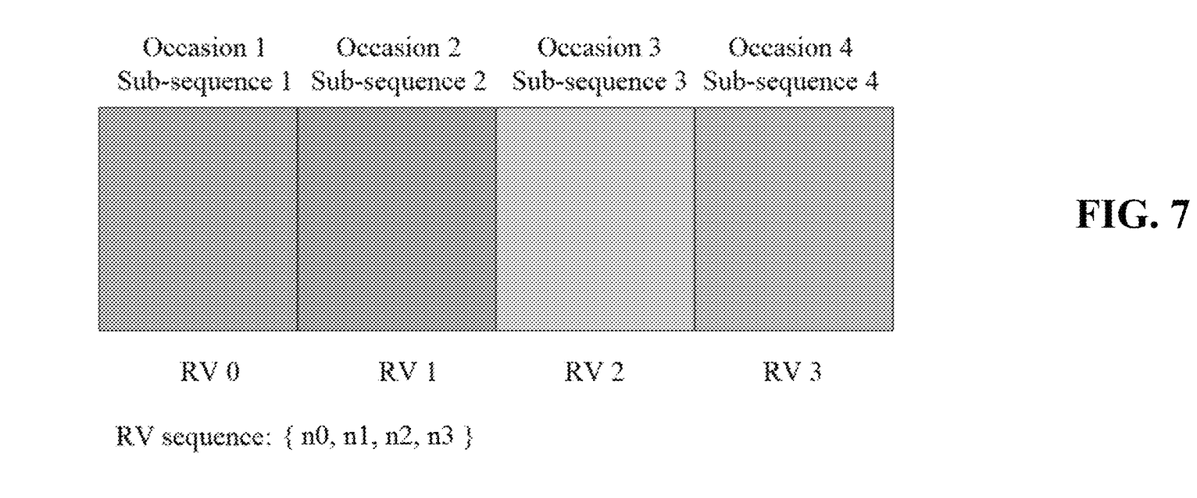
FIG. 7 shows an example of encoding repeated CSI transmissions.

Embodiments of the disclosed technology include encoding repetitions of the CSI report, and mapping the encoded output to physical resources. In some embodiments, the N repetition transmission(s) of the CSI report correspond to a length-L RV sequence. The l-th RV value in the RV sequence corresponds to the RV value used for the n-th transmission of the CSI report. In an example, l=n and L=N as shown in FIG. 7. As shown therein, CSI report repetition is performed in 4 occasions, where in each occasion, a sub-sequence of the encoded output is transmitted. For each sub-sequence, the encoding based on a RV value, and the four RV values, e.g. n1, n2, n3, n4, form a RV sequence {n1, n2, n3, n4}.

Figure 8:
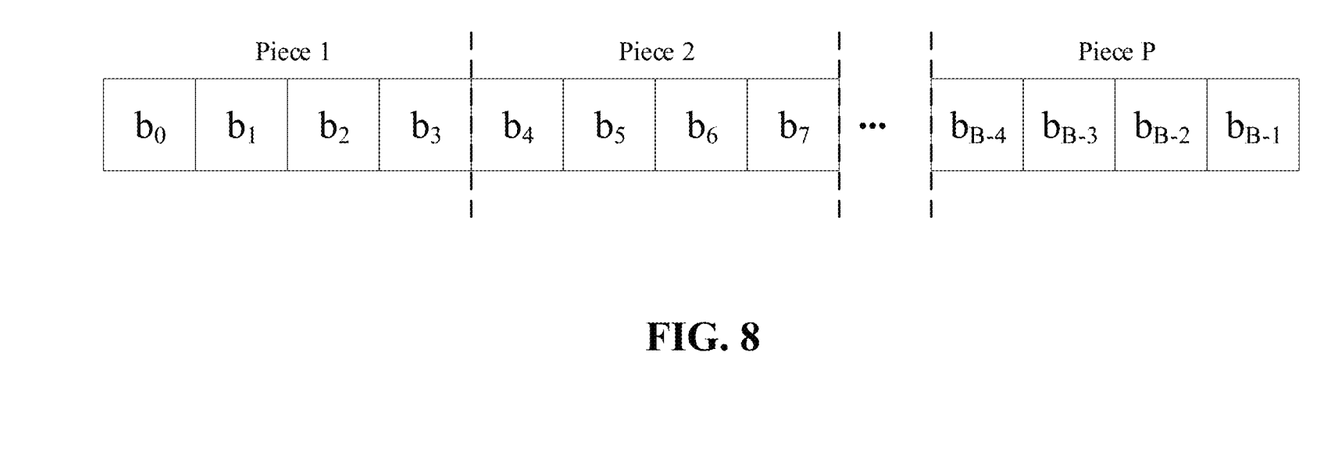
FIG. 8 shows another example of encoding repeated CSI transmissions.

In some embodiments, the N repetition transmission(s) of the CSI report corresponds to a P-piece encoded bit sequence. The CSI report is encoded to a B-bit encoded sequence $\{b_0, b_1, \ldots b_{B-1}\}$. The B bits may be split into P pieces. The p-th piece contains $B_p$ bits. In the n-th transmission of the CSI report, the p-th piece of the encoded bit sequence is transmitted. In an example, each of the P pieces contains X contiguous encoded bits, and the next bit, in the original sequence of B bits, of the last bit of one piece is the first bit of the next piece, as shown in FIG. 8. For example, the p-th bit sequence transmitted in the n-th transmission contains bits $\{b_{(p-1)X}, b_{(p-1)X+1}, b_{pX-1}\}$. X can be configured by BS. X can also be derived based on some rules, $$\text{e.g., } X = \frac{B}{P}, X = \left\lfloor \frac{B}{P} \right\rfloor, \text{ or } X = \left\lceil \frac{B}{P} \right\rceil.$$

In an example, P=N, and p=n.

Figure 9:
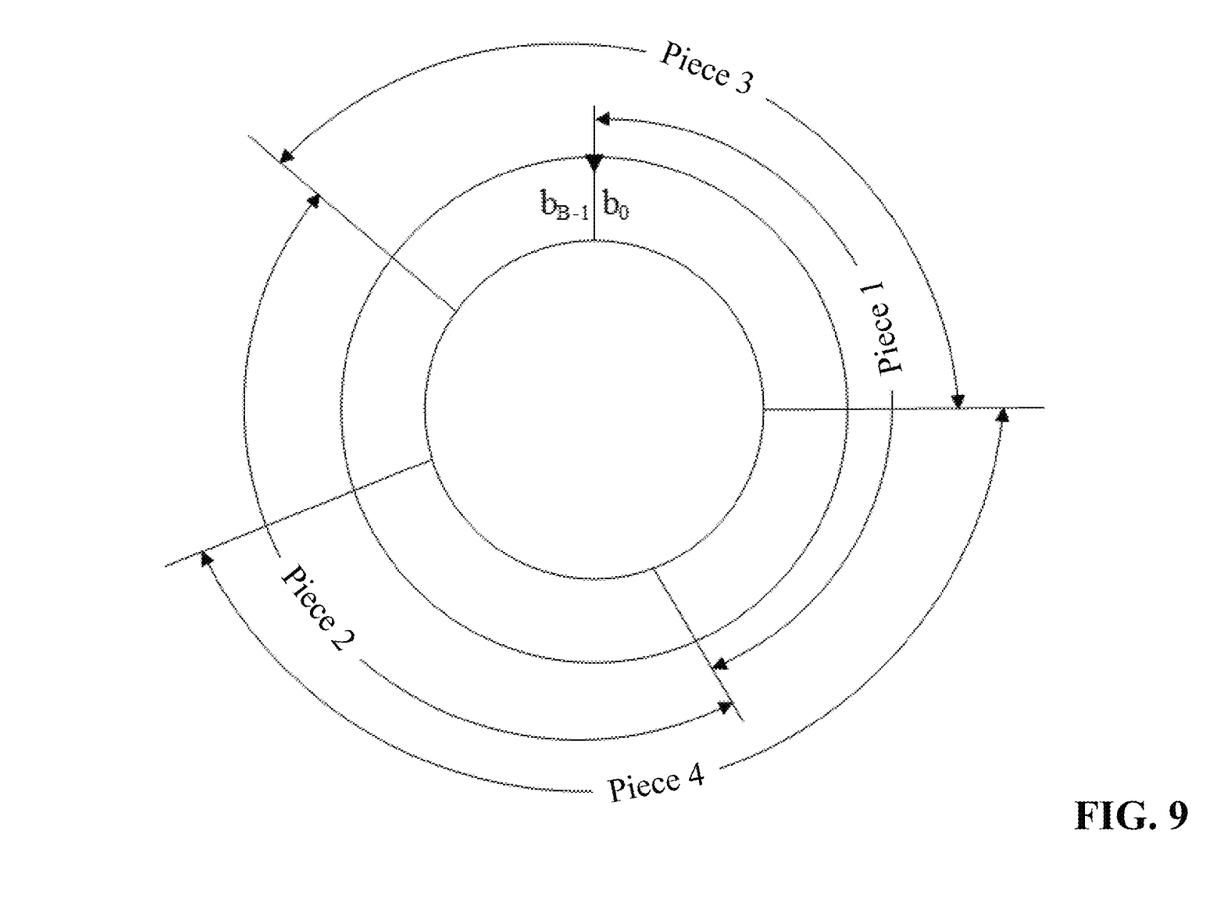
FIG. 9 shows yet another example of encoding repeated CSI transmissions.

In some embodiments, the N repetition transmission(s) of the CSI report corresponds to a Q-piece encoded bit sequence. The CSI report is encoded to a B-bit encoded sequence $\{b_0, b_1, b_{B-1}\}$. The B bits can be split into Q pieces with the q-th piece containing $B_q$ bits. In the n-th transmission of the CSI report, the q-th piece of the encoded bit sequence is transmitted. Each of the Q pieces contains Y contiguous coded bits, and the next bit, in a circular buffer of the original sequence of B bits, of the last bit of one piece is the first bit of the next piece. The above circular buffer means a bit sequence formed by the original B bits, in which, the next bit of $b_{K-1}$ is $b_K$ when $1 \leq K \leq B-1$, and the next bit of $b_{B-1}$ is $b_0$, as shown in FIG. 9. For example, the q-th bit sequence transmitted in the n-th transmission contains bits $\{b_{(q-1)Y \bmod B}, b_{[(q-1)X+1] \bmod B}, \ldots, b_{[qX-1] \bmod B}\}$. Y can be configured by BS, or Y can be a fixed (or predetermined) value. In an example, Y≥B/Q. In another example, Q=N, and q=n. In yet another example, each repetition occasion contains the B coded bits, and in each repetition occasion, the same coded bit sequence is transmitted.

For example, if the CSI report contains T≥2 parts, the information used for CSI repetition can be configured for each part separately, including at least one of: a number of transmissions, the repetition approach, the time gap between each two adjacent occasions in the repetition(s), and other similarly related parameters. In an example, the repetition of each part may be performed separately.

Scheme 4: Example Embodiments for Handling CSI Collisions

In some embodiments, two or more CSI reports may be scheduled to be transmitted using repetition, and one or more of these repeated transmissions may be scheduled for transmission in the same transmission occurrence. In an example, two CSI reports are said to collide if time occupancy (e.g., slot(s), OFDM symbol(s)) and/or frequency occupancy (e.g., sub-carrier(s), PRB(s)) of the CSI reports are overlapped. Embodiments of the disclosed technology provide methods and systems to resolve collisions.

In exemplary scenarios where collisions may occur, the two colliding transmissions are prioritized based on a priority rule, and only the higher priority transmission is performed, whereas the lower priority transmission may be dropped.

In some embodiments, CSI reporting with repetition transmission(s) has a higher priority than CSI reporting without repetition transmission(s), e.g. a single transmission. In other embodiments, CSI reporting triggered in later slot(s) has a higher priority than the CSI reporting triggered in former slot(s). In yet other embodiments, a CSI report of a first type with an earlier transmission occasion in its periodicity has higher priority than a CSI report of a second type with a later transmission occasion in its periodicity. In yet other embodiments, a CSI report transmission occasion with RV value 0 has higher priority than a CSI report transmission occasion with other RV values. In yet other embodiments, a CSI report transmission occasion with a smaller RV value has higher priority than a CSI report occasion with a larger RV values. In yet other embodiments, CSI report transmission occasion(s) with smaller bit sequence piece index(es) has higher priority than CSI report transmission occasion(s) with larger bit sequence piece index(es).

Figure 10:
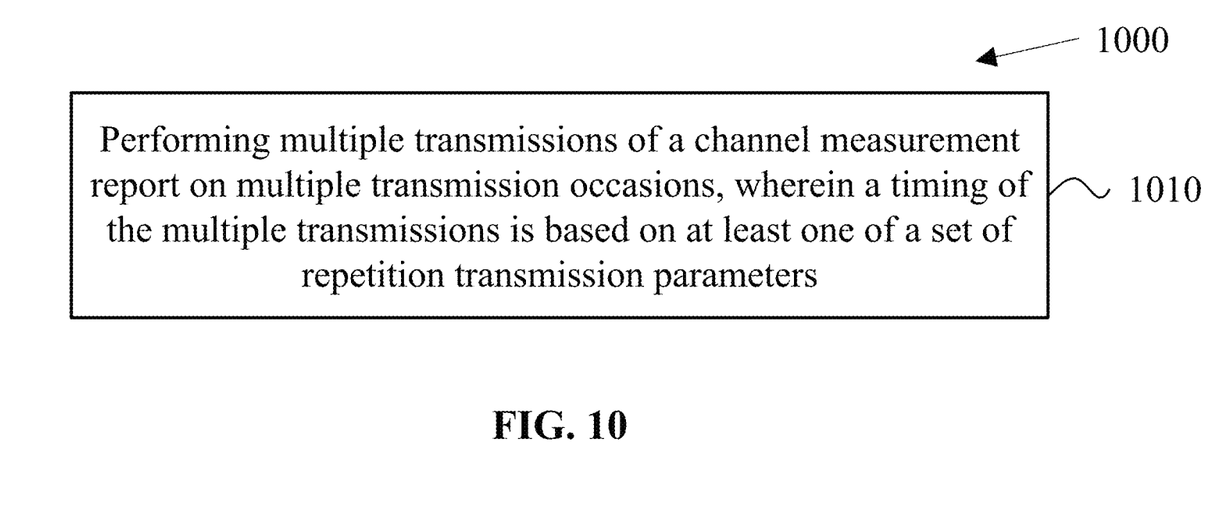
FIG. 10 shows an example of a wireless communication method for channel state information feedback.

FIG. 10 shows an example of a wireless communication method 1000 for channel state information feedback. The method 1000 may be implemented by a mobile device or UE. The method 1000 includes, at step 1010, performing multiple transmissions of a channel measurement report on multiple transmission occasions, wherein a timing of the multiple transmissions is based on at least one of a set of repetition transmission parameters. In some embodiments, the set of repetition transmission parameters include a number of the multiple transmission occasions, a time gap between adjacent transmission occasions of the multiple transmission occasions, and one or more timeslots that include the multiple transmission occasions. In other embodiments, at least one of the multiple transmissions is performed in each of the one or more timeslots.

In some embodiments, determining the one or more timeslots is based on a bitmap for a set of candidate timeslots. In an example, the set of candidate slots includes timeslots between two timeslots, and where the two timeslots are identified based on a reporting period and a reporting timeslot offset. In another example, the set of candidate slots include a predetermined number of contiguous timeslots.

In some embodiments, the second and subsequent of the one or more timeslots are $G \times T_p$ timeslots after the initial timeslot, where G is an integer, and where $T_p$ is the time gap between adjacent transmission occasions of the multiple transmission occasions.

In some embodiments, the multiple transmission occasions are determined based on a reporting period and/or a reporting timeslot offset. In other embodiments, the multiple transmission occasions are determined based on a number of timeslots after the timeslot in which a trigger for the transmissions is received. In an example, the number of timeslots may be a fixed or predetermined value. In another example, the number of timeslots may be signaled by the BS.

In some embodiments, the method 1000 further includes receiving a signal that deactivates the performing multiple transmissions, where a last of the one or more timeslots is a fixed number of timeslots after a timeslot in which the deactivation signal is received.

In some embodiments, the repetitions of the channel measurement report may be encoded using a procedure described in the "Scheme 3: Example Embodiments for CSI Encoding and Mapping" section of the present document.

In some embodiments, two of the multiple transmissions may be scheduled for the same transmission occasion (referred to as a collision), and a priority rule as described in the "Scheme 4: Example Embodiments for Handling CSI Collisions" section of the present document may be used to determine which of the two transmissions is performed, and which one of the two transmissions is dropped.

In some embodiments, the channel measurement report may be transmitted semi-persistently over a physical uplink shared channel (PUSCH). In other embodiments, the channel measurement report may be transmitted aperiodically over a physical uplink control channel (PUCCH). In yet other embodiments, the wireless node is a user equipment operating in a mobile communication network, and the channel measurement report includes CSI.

Figure 11:
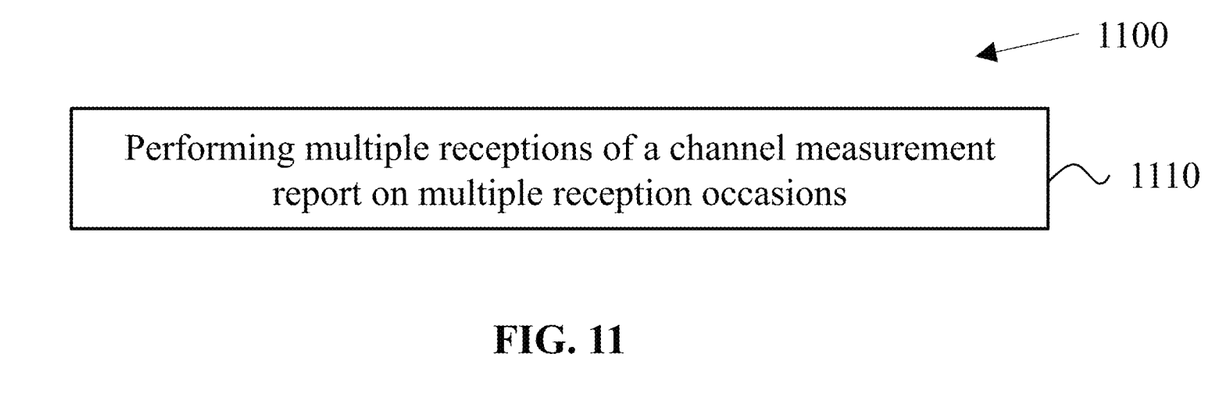
FIG. 11 shows another example of a wireless communication method for channel state information feedback.

FIG. 11 shows another example of a wireless communication method 1100 for channel state information feedback. The method 1100 may be implemented by a network node such as the BS. The method 1100 includes, at step 1110, performing multiple receptions of a channel measurement report on multiple reception occasions. In some embodiments, a timing of the multiple receptions is based on at least one of a number of the multiple reception occasions, a time gap between adjacent reception occasions of the multiple reception occasions, and one or more timeslots that include the multiple reception occasions.

In some embodiments, the one or more timeslots including the number of multiple reception occasions is determined based on a bitmap for a set of candidate timeslots, and the method 1100 further includes transmitting the bitmap for the candidate timeslots. In an example, the set of candidate slots includes timeslots between two timeslots, and where the two timeslots are identified based on a reporting period and a reporting timeslot offset. In another example, the set of candidate slots include a predetermined number of contiguous timeslots.

In some embodiments, the method 1100 includes transmitting a deactivation signal, which deactivates multiple transmissions from a wireless node (e.g. UE) corresponding to the multiple receptions. In other embodiments, the method 1100 includes transmitting a trigger signal, which triggers multiple transmissions corresponding to the multiple receptions.

In some embodiments, the repetitions of the channel measurement report that were received in the multiple receptions may be encoded using a procedure described in the "Scheme 3: Example Embodiments for CSI Encoding and Mapping" section of the present document.

In some embodiments, two of the multiple receptions may be scheduled for the same reception occasion (referred to as a potential collision), and a priority rule as described in the "Scheme 4: Example Embodiments for Handling CSI Collisions" section of the present document may be used to determine which of the two receptions is performed, and which one of the two receptions is not performed.

In some embodiments, the channel measurement report may be received semi-persistently over a physical uplink shared channel (PUSCH). In other embodiments, the channel measurement report may be received aperiodically over a physical uplink control channel (PUCCH). In yet other embodiments, the wireless node of method 1100 is a network node (or base station, or gNB) operating in a mobile communication network, and the channel measurement report include CSI.

Figure 12:
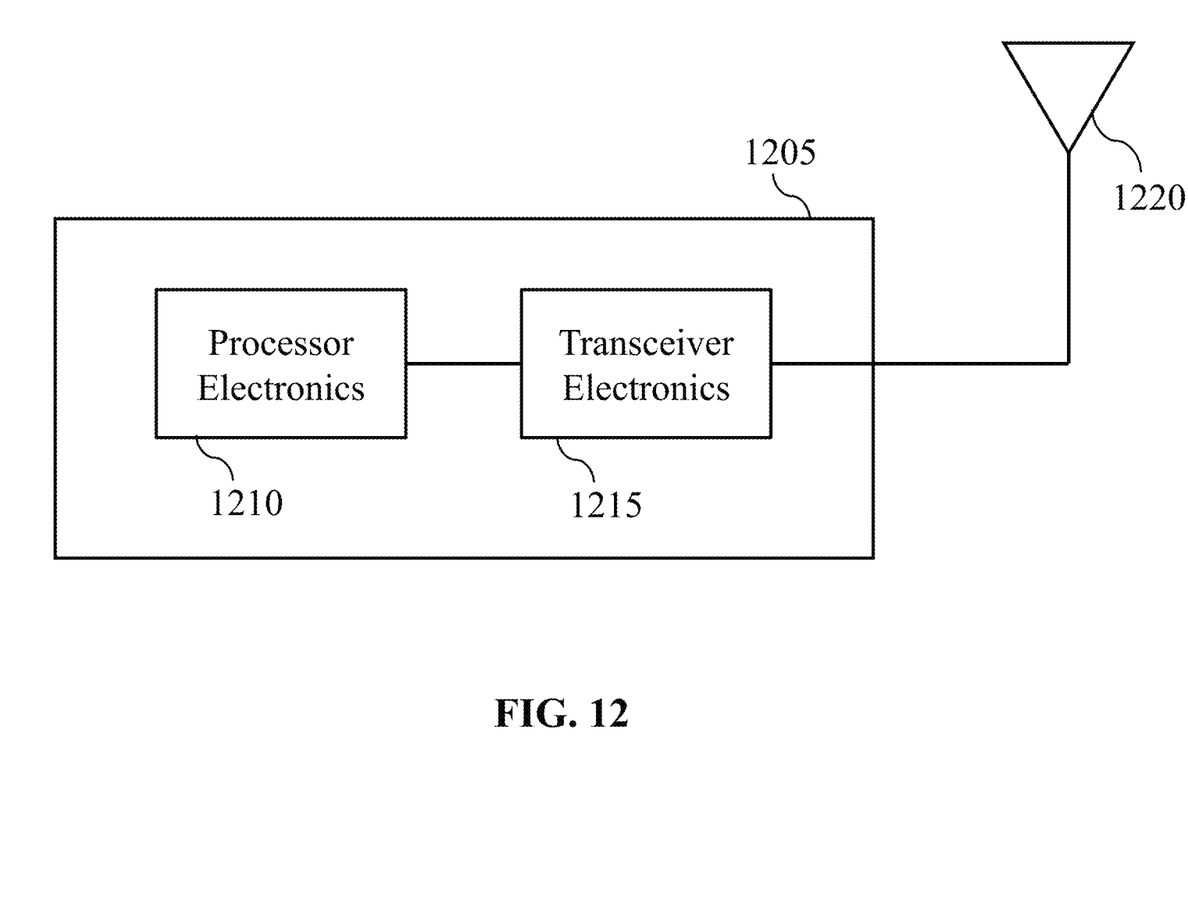
FIG. 12 is a block diagram representation of a portion of an apparatus that may implement a method or technique described in this patent document.

FIG. 12 is a block diagram representation of a portion of a radio station, in accordance with some embodiments of the presently disclosed technology. A radio station 1205, such as a base station or a wireless device (or UE), can include processor electronics 1210 such as a microprocessor that implements one or more of the techniques presented in this document. The radio station 1205 can include transceiver electronics 1215 to send and/or receive wireless signals over one or more communication interfaces such as antenna(s) 1220. The radio station 1205 can include other communication interfaces for transmitting and receiving data. Radio station 1205 can include one or more memories (not explicitly shown) configured to store information such as data and/or instructions. In some implementations, the processor electronics 1210 can include at least a portion of the transceiver electronics 1215. In some embodiments, at least some of the disclosed techniques, modules or functions are implemented using the radio station 1205. The radio station 1205 may be used to implement the above-described methods 1000 or 1100.

It is intended that the specification, together with the drawings, be considered exemplary only, where exemplary means an example and, unless otherwise stated, does not imply an ideal or a preferred embodiment. As used herein, the singular forms "a", "an" and "the" are intended to include the plural forms as well, unless the context clearly indicates otherwise. Additionally, the use of "or" is intended to include "and/or", unless the context clearly indicates otherwise.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method for wireless communication, implemented at a wireless node, comprising:
   performing multiple transmissions of a channel measurement report on multiple transmission occasions,
   wherein a timing of the multiple transmissions is based on any one or more of a number of the multiple transmission occasions, a time gap between adjacent transmission occasions of the multiple transmission occasions, and one or more timeslots comprising the multiple transmission occasions, and
   wherein the one or more timeslots comprising the number of the multiple transmission occasions is determined based on a bitmap for a set of candidate timeslots.

2. The method of claim 1, further comprising:
   performing at least one of the multiple transmissions in each of the one or more timeslots.

3. The method of claim 1, wherein the set of candidate timeslots comprises (a) timeslots between two timeslots that are identified based on a reporting period and a reporting timeslot offset, or (b) a predetermined number of contiguous timeslots.

4. The method of claim 1, wherein a second and subsequent of the one or more timeslots comprising the multiple transmission occasions are $G \times T_p$ timeslots after an initial timeslot of the one or more timeslots, wherein G is an integer, and wherein $T_p$ is the time gap between adjacent transmission occasions of the multiple transmission occasions.

5. The method of claim 1, further comprising:
   determining, based on a reporting period, a reporting timeslot offset, or a number of timeslots after a timeslot in which the performing multiple transmissions is triggered, a first of the number of the multiple transmission occasions.

6. The method of claim 5, wherein the number of timeslots is a predetermined value or indicated by signaling information.

7. The method of claim 1, further comprising:
receiving a signal that deactivates the performing multiple transmissions, wherein a last of the one or more timeslots is a fixed number of timeslots after a timeslot in which the signal is received.

8. The method of claim 1, further comprising:
generating an encoded sequence by encoding repetitions of the channel measurement report, wherein the channel measurement report is based on the encoded sequence.

9. The method of claim 8, wherein identical portions of the encoded sequence are transmitted in each of the number of the multiple transmission occasions.

10. The method of claim 8, further comprising:
segmenting the encoded sequence into a plurality of contiguous sub-sequences in a non-overlapping manner; and
transmitting each of the plurality of contiguous sub-sequences in each of the number of the multiple transmission occasions.

11. The method of claim 8, further comprising:
mapping the encoded sequence to a circular buffer;
generating a plurality of contiguous sub-sequences, wherein each of the plurality of contiguous sub-sequences comprises a predetermined number of symbols, wherein a first symbol of a first of the plurality of contiguous sub-sequences is a starting symbol of the encoded sequence in the circular buffer, wherein a second and subsequent of the plurality of contiguous sub-sequences are non-overlapping contiguous portions of encoded sequence in the circular buffer, wherein a sum of the predetermined number of symbols of each of the plurality of contiguous sub-sequences is greater than a number of symbols of the encoded sequence, and wherein the predetermined number of symbols of each of the plurality of contiguous sub-sequences and the starting symbol of the encoded sequence in the circular buffer is specified by signaling information; and
transmitting each of the plurality of contiguous sub-sequences in each of the number of the multiple transmission occasions.

12. The method of claim 8, wherein the encoding is based on a redundant value (RV) sequence, and wherein the method further comprises:
segmenting the encoded sequence into a plurality of contiguous sub-sequences in a non-overlapping manner; and
transmitting each of the plurality of contiguous sub-sequences in each of the number of the multiple transmission occasions based on each of the RV sequence.

13. The method of claim 1, wherein a first set of transmissions comprises the multiple transmissions of the channel measurement report, wherein a second set of transmissions comprises at least one transmission of another channel measurement report, wherein one of the first set of transmissions and one of the second set of transmissions are both scheduled on a transmission occasion in the one or more timeslots, wherein the one of the first set of transmissions has a higher priority than the one of the second set of transmissions based on a priority rule, wherein the one of the first set of transmissions is performed on the transmission occasion, and wherein the one of the second set of transmissions is dropped.

14. The method of claim 13, wherein the at least one transmission of another channel measurement report comprises a single transmission.

15. The method of claim 13, wherein the one of the first set of transmissions has a first index, and wherein the one of the second set of transmissions has a second index greater than the first index.

16. The method of claim 15, wherein the first index is a redundant version (RV) value.

17. The method of claim 1, wherein the channel measurement report is transmitted semi-persistently over a physical uplink shared channel (PUSCH).

18. The method of claim 1, wherein the channel measurement report is transmitted aperiodically over a physical uplink control channel (PUCCH).

19. The method of claim 1, wherein the wireless node is a user equipment operating in a mobile communication network, and wherein the channel measurement report comprises channel state information (CSI).

20. A wireless communication apparatus, comprising:
a processor configured to implement a method, the processor configured to:
perform multiple transmissions of a channel measurement report on multiple transmission occasions,
wherein a timing of the multiple transmissions is based on any one or more of a number of the multiple transmission occasions, a time gap between adjacent transmission occasions of the multiple transmission occasions, and one or more timeslots comprising the multiple transmission occasions, and
wherein the one or more timeslots comprising the number of the multiple transmission occasions is determined based on a bitmap for a set of candidate timeslots.

21. The wireless communication apparatus of claim 20, wherein the set of candidate timeslots comprises (a) timeslots between two timeslots that are identified based on a reporting period and a reporting timeslot offset, or (b) a predetermined number of contiguous timeslots.

22. The wireless communication apparatus of claim 20, wherein a second and subsequent of the one or more timeslots comprising the multiple transmission occasions are $G \times T_p$ timeslots after an initial timeslot of the one or more timeslots, wherein G is an integer, and wherein $T_p$ is the time gap between adjacent transmission occasions of the multiple transmission occasions.

23. The wireless communication apparatus of claim 20, wherein the processor is further configured to:
determine, based on a reporting period, a reporting timeslot offset, or a number of timeslots after a timeslot in which the performing multiple transmissions is triggered, a first of the number of the multiple transmission occasions.

24. The wireless communication apparatus of claim 20, wherein the processor is further configured to:
receive a signal that deactivates the performing multiple transmissions, wherein a last of the one or more timeslots is a fixed number of timeslots after a timeslot in which the signal is received.

25. The wireless communication apparatus of claim 20, wherein the processor is further configured to:
generate an encoded sequence by the processor configured to encode repetitions of the channel measurement report, wherein the channel measurement report is based on the encoded sequence.

\* \* \* \* \*